Aug. 4, 1959    S. TEPPER    2,898,010
MEASURING AND DISPENSING DEVICE
Filed July 13, 1955
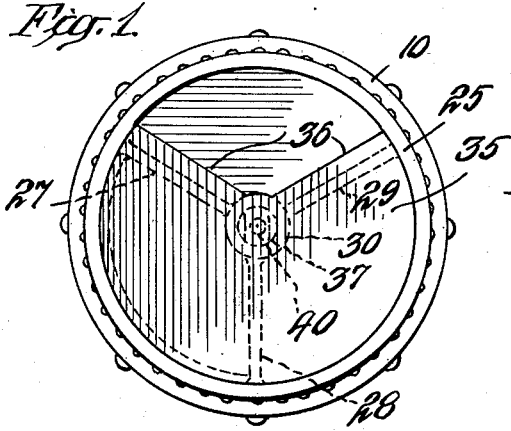
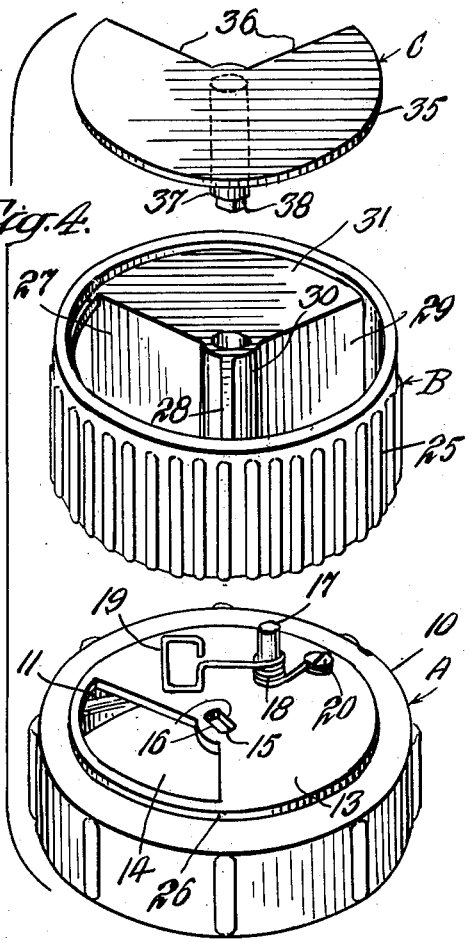
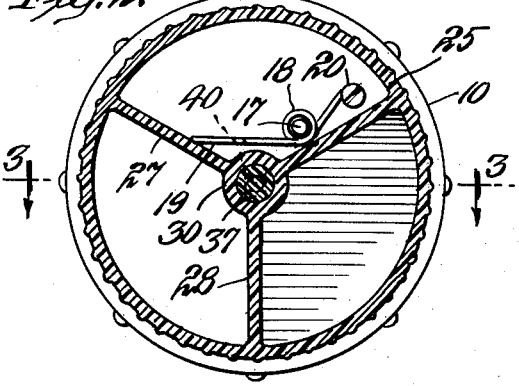
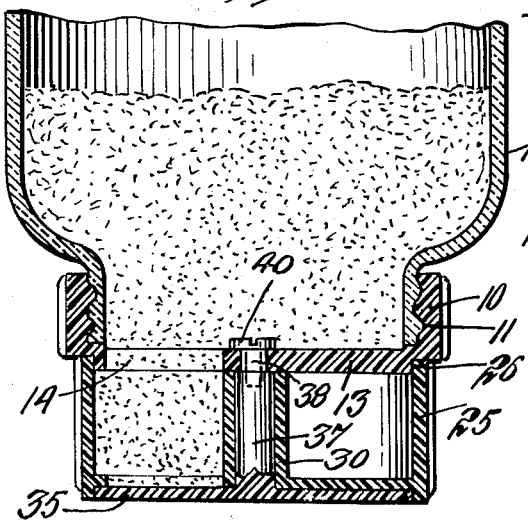
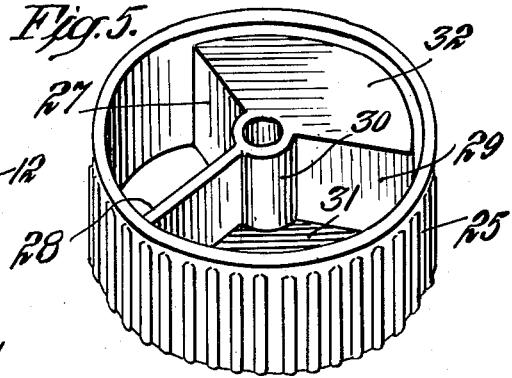
INVENTOR.
SOLOMON TEPPER
BY
Luther W. Hawley
ATTORNEY

2,898,010
MEASURING AND DISPENSING DEVICE

Solomon Tepper, Rockville Centre, N.Y.

Application July 13, 1955, Serial No. 521,930

2 Claims. (Cl. 222—339)

This invention relates to a measuring and dispensing device.

At the present time much of the coffe used is in powdered form and the coffee is measured by the spoonful and placed in the cup.

This invention has for its salient object to provide a simple, inexpensive, and practical measuring device that can be screwed to the container having the material to be measured, and by a simple oscillation and release will dispense a measured quantity of the material into a cup.

Further objects of the invention will appear from the following specification taken in connection with the drawings which form a part of this application and in which Fig. 1 is a bottom plan view of the device constructed in accordance with the invention;

Fig. 2 is a horizontal, sectional plan view through the device shown in Fig. 1;

Fig. 3 is a sectional elevation taken substantially on line 3—3 of Fig. 2, looking in the direction of the arrows, and showing the device as mounted on the outlet end of a container;

Fig. 4 is an exploded view showing in perspective the various parts of the device in the position in which they are to be assembled; and Fig. 5 is a perspective view of the oscillatable intermediate part of the device looking in the opposite direction from the showing in Fig. 4.

Although the device will be described particularly in connection with dispensing coffee, it should be understood that it is equally adapted to measure and dispense any other powdered material.

The three main parts of the device are shown in the exploded view in Fig. 4 at A, B and C. The part A consists of a cap 10 which is threaded, as shown at 11, to facilitate the attachment of the device to the threaded end of a container 12. The cap 10 has a bottom 13 and the bottom has a sector-shaped opening 14 therein. In the center of the bottom there is an opening 15 which has substantially flat sides 16, the purpose of which will be hereinafter described.

The bottom 13 has secured thereto a post 17 on which is mounted a spring 18 having an enlarged end portion 19 at one end and having the other end secured to a fixed screw or stud 20 carried by the base 13.

The member B is substantially cylindrical in shape, having a cylindrical wall 25 which fits over the outer edge or flange 26 of the base 13 and is oscillatable thereon.

The member B has formed within its cylindrical walls three partitions 27, 28 and 29. These partitions are joined to a central hub 30. The partitions 27 and 29 are connected at one end of the oscillating member by means of a cover or a sector-shaped closure 31. The partitions 28 and 29 are covered over at the other end of the oscillating member by a sector-shaped closure 32. The space between the partitions 27 and 28 is open at both ends.

As shown in Fig. 4, the closure member 31 is spaced inwardly from the outer end of the cylindrical wall 25 and the ends of the partition members and the hub are also spaced inwardly, thus forming a ledge. This ledge receives the segmental disk 35 of the third member C of the assembly. The disk 35 has a sector-shaped opening 36 which corresponds in size to the opening 14 through the base 13 of the cap 10.

The closure 32 and the ends of the partitions at the other end of the cylindrical wall 25 are also spaced inwardly from the outer edge of the cylindrical wall, thus forming a ledge which receives the outer edge of the base 13 of the cap 10.

The disk has secured to its center, a post or spindle 37 adapted to fit within the hub 30 and having a reduced end 38 corresponding in shape to the opening 15 in the base 13 of the cap 10. The outer end of the spindle or post 37 is threaded to receive a screw 40 which holds the parts in assembled position, as shown in Fig. 3.

When the device is to be assembled, the post 37 is inserted in the hub 30 with the disk positioned as shown in Fig. 4, in which position the opening 36 in the disk will be disposed over the closure 31 in the end of the oscillatable member B. The member B is then placed over the base 13 of the cap 10 and the reduced end 38 of the spindle is inserted in the correspondingly shaped opening 15 of the base 13. Thus the disk 35 and the cap will be held in fixed position relative to each other. The member B, however, is oscillatable on the cap and it is assembled thereon in such a manner that the end 19 of the spring 18 will engage the wall or partition 27. It will be understood that the space between the partitions 27 and 29 is closed at one end by the base 13 of the cap 10 and is closed at the other end by the disk 35. This forms a closed pocket for the spring.

When the device is screwed onto the outlet end of a container, as shown in Fig. 3, the material, such as powdered coffee, in the container will drop through the opening 14 into the pocket which is closed at the bottom by the disk 35. When the member B is oscillated, the material in the pocket will be pushed by the partition over the opening 36 in the disk 35 through which it will be discharged into the cup or other container to receive the material. After this has been accomplished the oscillatable member B is released and will be returned to its initial position by the spring 18.

It will be noted from the foregoing description that the device described comprises a minimum number of parts which are held in assembled position by a single screw 40.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. A measuring and dispensing device for a container comprising a cap member having a bottom wall and means extending from one side of said wall for releasably engaging the mouth of said container, said bottom wall having a sector shaped opening therein, a disk spaced from the other side of said cap wall, a post extending from the central portion of said disk and fixed to a central portion of said cap wall, a cylindrical member located between the other side of said cap wall and said disk and arranged for oscillatory movement relative thereto, said cylindrical member having an axial hub portion for passing said post and partition means extending radially outward of said hub portion to provide a pair of adjacent sector shaped compartments, said cylindrical member further including a sector shaped end wall portion located at the outer end of said member for closing one of said compartments, the other compartment being open at the opposite ends of said member, said disk having a sector shaped opening angularly displaced from the opening in said cap wall, said cylindrical member being movable from a position wherein one end of said other compartment registers with the opening in said cap wall while the other end thereof is closed by said disk to permit filling with the contents of said container, to a second position wherein said other compartment is closed at said one end thereof by said cap wall while the other end of said other compartment registers with the opening in said disk to permit dispensing the contents of said other compartment, and resilient means enclosed within said one compartment for returning said cylindrical member from its second position to its first position.

2. A device as in claim 1 wherein said post is integral with said disk, said cap wall having a central opening and said post having a reduced end portion non-rotatably received in the central opening of said cap wall, and means passing through said cap wall and engaging said post for holding said disk and cylindrical member in assembled relation to said cap member.

References Cited in the file of this patent

UNITED STATES PATENTS

| | | |
|---|---|---|
| 479,982 | Heath | Aug. 2, 1892 |
| 1,752,720 | Bergelson | Apr. 1, 1930 |
| 1,944,447 | McVicker | Jan. 23, 1934 |
| 2,196,721 | Boyle | Apr. 9, 1940 |
| 2,393,454 | Bailey | Jan. 22, 1946 |